United States Patent [19]
Liu et al.

[11] Patent Number: 6,036,309
[45] Date of Patent: Mar. 14, 2000

[54] TEMPLE STRUCTURE FOR A PAIR OF EYEGLASSES

[76] Inventors: Jung-Chuan Liu; Chih-Hsin Liu, both of No. 635, Chung-Cheng Road, Tsao Twen Town, Nan Tou Hsien, Taiwan

[21] Appl. No.: 09/235,909

[22] Filed: Jan. 25, 1999

[51] Int. Cl.[7] ..................................................... G02C 5/14
[52] U.S. Cl. .............................. 351/111; 351/41; 351/158
[58] Field of Search ..................................... 351/111, 113, 351/114, 118, 119, 121, 158, 41

[56] References Cited

U.S. PATENT DOCUMENTS 5,233,371   8/1993   Guillet ...................................... 351/111

*Primary Examiner*—Hung Xuan Dang
*Attorney, Agent, or Firm*—Charles E. Baxley, Esq.

[57] ABSTRACT

A temple structure of the eyeglasses includes a chamber defined in the end thereof which is pivotally connected to the front of the eyeglasses, a transparent portion is defined in the outside of the temple so as to see the interior of the chamber. A perfume tube is received in the chamber and has a valve device attached thereto which has an operation end extending from the end of the temple so that when pivoting the temple toward the front, the operation end is pushed and the perfume is dispensed from the outlet defined in the operation end.

5 Claims, 5 Drawing Sheets

TEMPLE STRUCTURE FOR A PAIR OF EYEGLASSES

FIELD OF THE INVENTION

The present invention relates to a temple structure for a pair of eyeglasses, and more particularly, to a temple which has a chamber for receiving a perfume tube and a valve therein so that when pivoting the temples of the pair of eyeglasses, the perfume is dispensed.

BACKGROUND OF THE INVENTION

A conventional pair of eyeglasses comprises a front with two temples pivotally connected to two ends of the front, each of the temples having an end piece to engage with the wearer's ears. Generally, people need the eyeglasses to see or watch things clearly and some wearers want their eyeglasses to have a good looking shape. In fact, the wearers wear their eyeglasses for a long period of time in each day life especially the wearers who have to wear them such as the eyeglasses having lens for near-sighted people or sunglasses for the people who are working or living in an area having bright sunshine. Therefore, people will be appreciated if the eyeglasses have other function different from those which are well known.

The present invention intends to provide a pair of eyeglasses wherein the temples of the eyeglasses each have a chamber with a perfume tube and a valve received therein so that the perfume will be dispensed when pivoting the temples to actuate the valves. The new structure of the temples in accordance with present invention provides a brand new feature which is never seen in the conventional temples.

SUMMARY OF THE INVENTION

In accordance with one aspect of the present invention, there is provided a temple structure for a pair of eyeglasses, comprising a temple having a chamber defined therein and a hole defined in the first end thereof which is pivotally engaged with the front, wherein the hole communicates with the chamber. A tube for receiving perfume therein is received in the chamber and has a valve means received therein. The valve means has an operation end extending through the hole so that when the end of the temple is pivoted to contact the front of the frame of the eyeglasses, the operation end is pushed to dispense the perfume.

It is an object of the present invention to provide a temple having a perfume tube received therein which is operated when the temple contacts the front of the frame of the eyeglasses.

Another embodiment of the present invention is to provide a temple which has a decorative member received in the chamber of the temple wherein the temple has a transparent portion so as to see the decorative member from outside.

Further features of the present invention will become apparent after a careful reading of the detailed description with appropriate reference to the accompanying drawings.

DETAILED DESCRIPTION OF THE PREFERRED EMBODIMENTS

Figure 1:
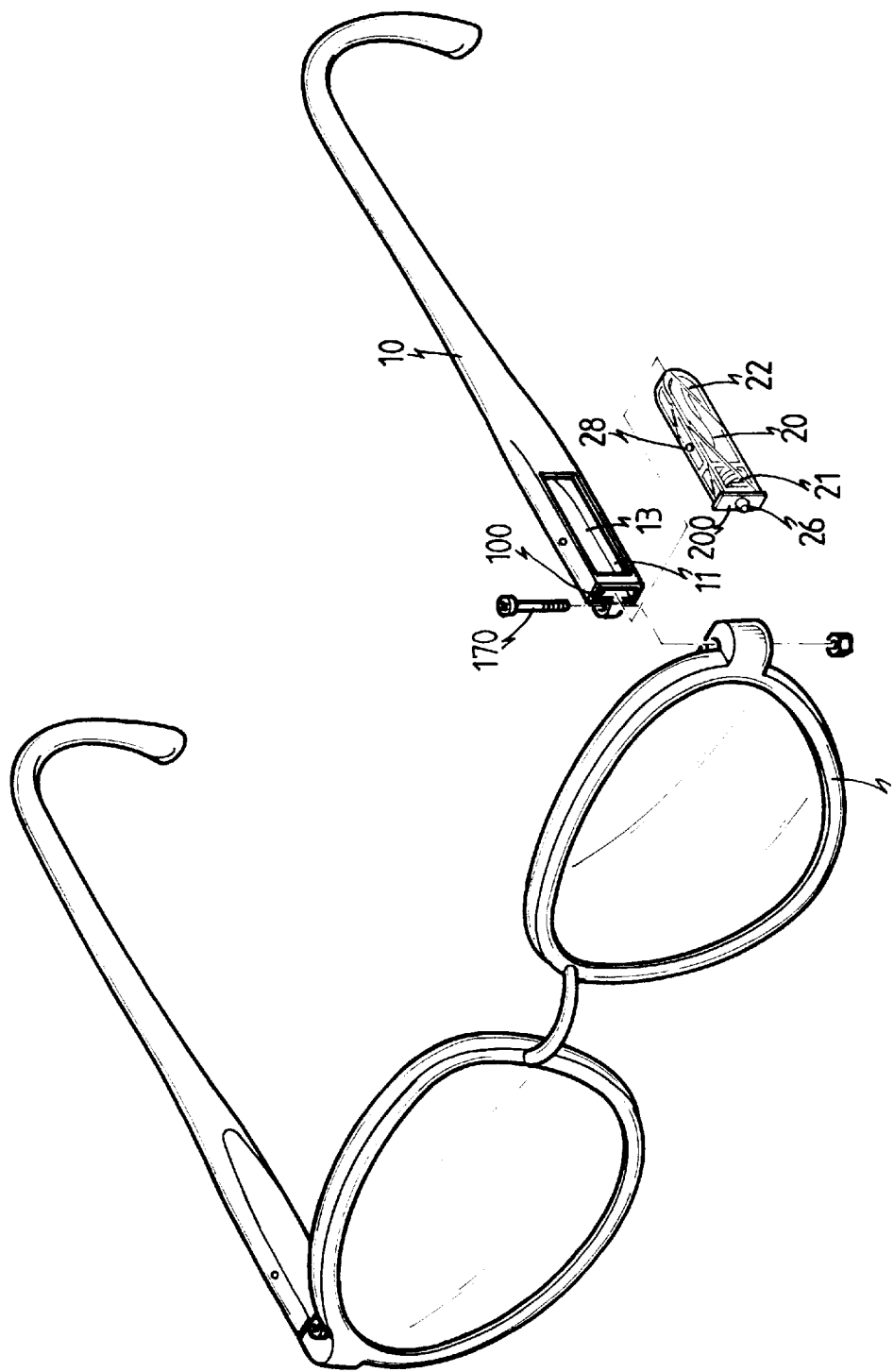
FIG. 1 is an exploded view of the temple structure in accordance with the present invention.
Figure 2:
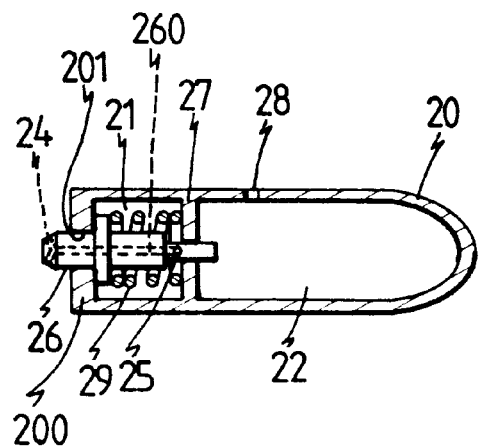
FIG. 2 is a side elevational view, partly in section, of the tube and the valve means in accordance with the present invention, wherein the valve means is not yet actuated.
Figure 4:
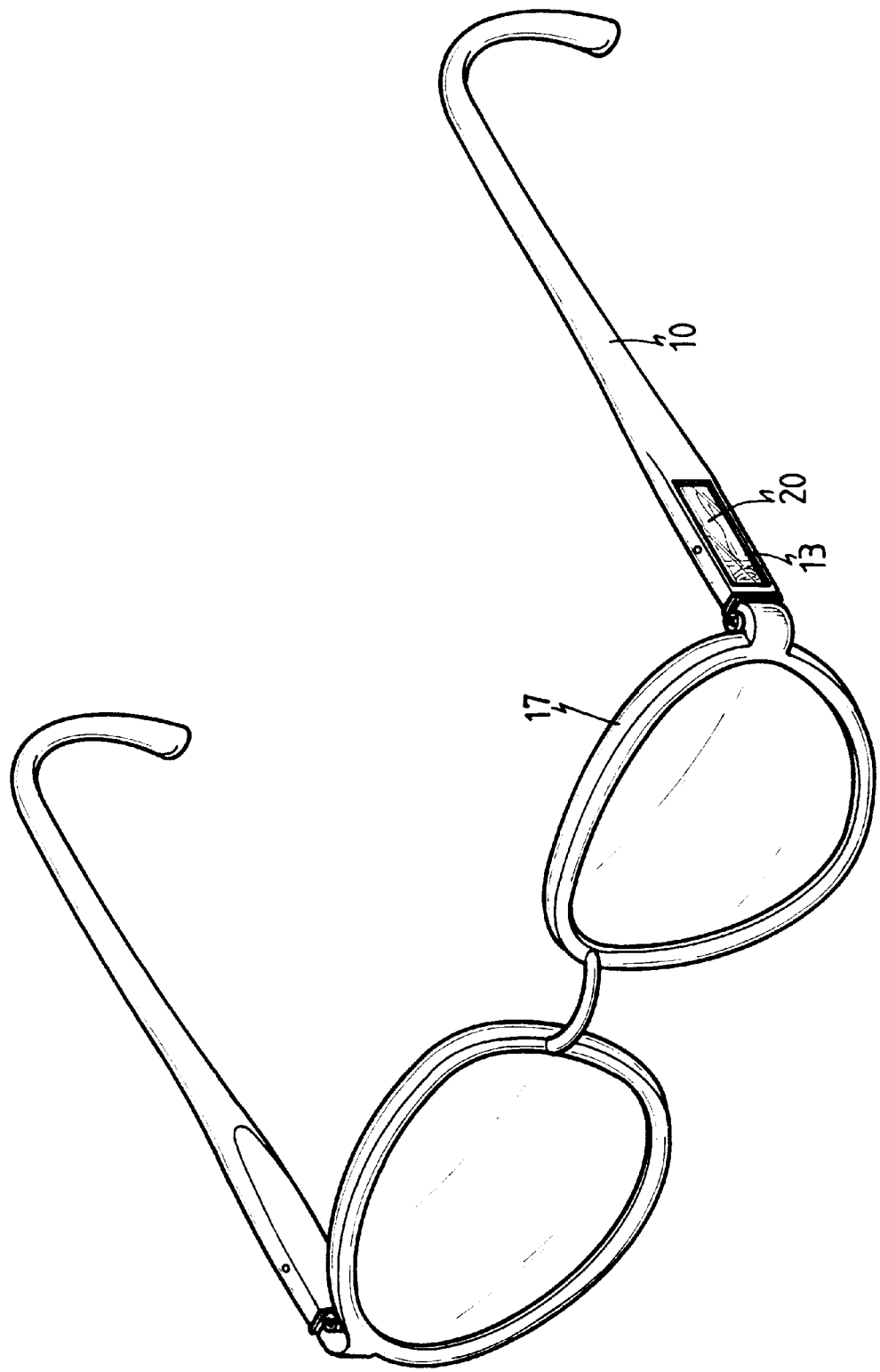
FIG. 4 is a perspective view of the temples connected to the front of the frame wherein the valve means is actuated.

Referring to FIGS. 1, 2 and 4, the temple structure in accordance with the present invention comprises a temple 10 having a first end pivotally engage with the front 17 by a pin member 170 and a second end which is a curved end. A chamber 13 is defined in the temple 10 and a hole 14 is defined in the first end of the temple 10, wherein the hole 14 communicates with the chamber 13. A transparent portion 11 is defined in the outside of the temple 10 so that the interior of the chamber 13 can be seen via the transparent portion 11.

Figure 3:
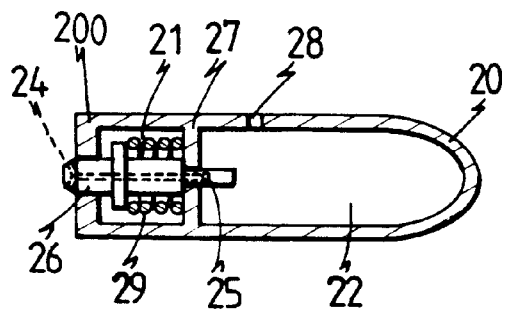
FIG. 3 is a side elevational view, partly in section, of the tube and the valve means in accordance with the present invention, wherein the valve means is actuated.

A tube 20 is received in the chamber 13 from the opening 100 in the first end of the temple 10 and has an end plate 200 fixedly connected to the tube 20 so as to close the opening 100. The tube 20 has an annular flange 27 extending radially inward from the inside thereof so as to define a first space 21 and a second space 22 separated by the annular flange 27, wherein the second space 22 can receive perfume therein. An aperture 201 is defined through the end plate 200 and communicates with the first space 21 in which a valve means is received. A passage 210 is defined in the body of the valve means to which a spring 29 is mounted. The spring 29 is biased between the annular flange 27 and inside of the end plate 200. An inlet 25 is defined radially through the wall of the body of the valve means and communicates with the passage 260. The operation end 26 extends through the aperture 201 and the hole 14 so that when the temple 1 is pivoted to let the operation end 26 contact the frame 17, the operation end 26 is pushed as shown in FIG. 3. The operation end 26 further has an outlet 24 defined through the distal end thereof and the outlet 24 communicates with the passage 260. Accordingly, when the operation end 26 is pushed, the inlet 25 is shifted beyond the annular flange 27 and into the second space 22, and perfume in the second space 22 will flow in the passage 260 via the inlet 25 so that the smell of the perfume may be dispensed from the outlet 24. A supply valve 28 is attached to the tube 20 and communicates with the second space 22 so as to feed perfume into the second space 22.

Figure 5:
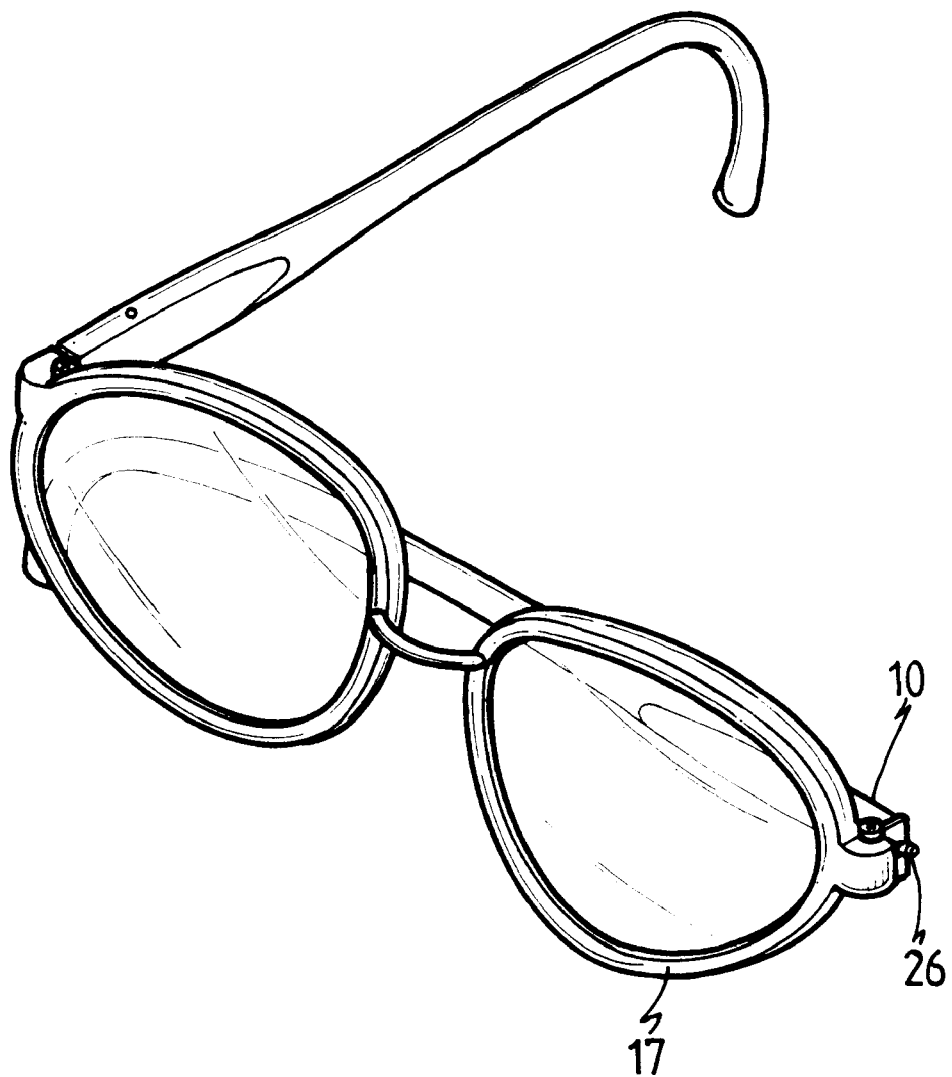
FIG. 5 is a perspective view of the temples connected to the front of the frame wherein the valve means in one of the temples is not actuated, and FIG. 6 an exploded view of another embodiment of the temple structure in accordance with the present invention.

When pivoting one of the temple 10 as shown in FIG. 5, the operation end 26 is removed from the frame 17 so that the operation end 26 biased by the spring 29 n back to its original position and the inlet 25 is removed from the second space 22 so that the perfume will not enter the passage 260.

Figure 6:
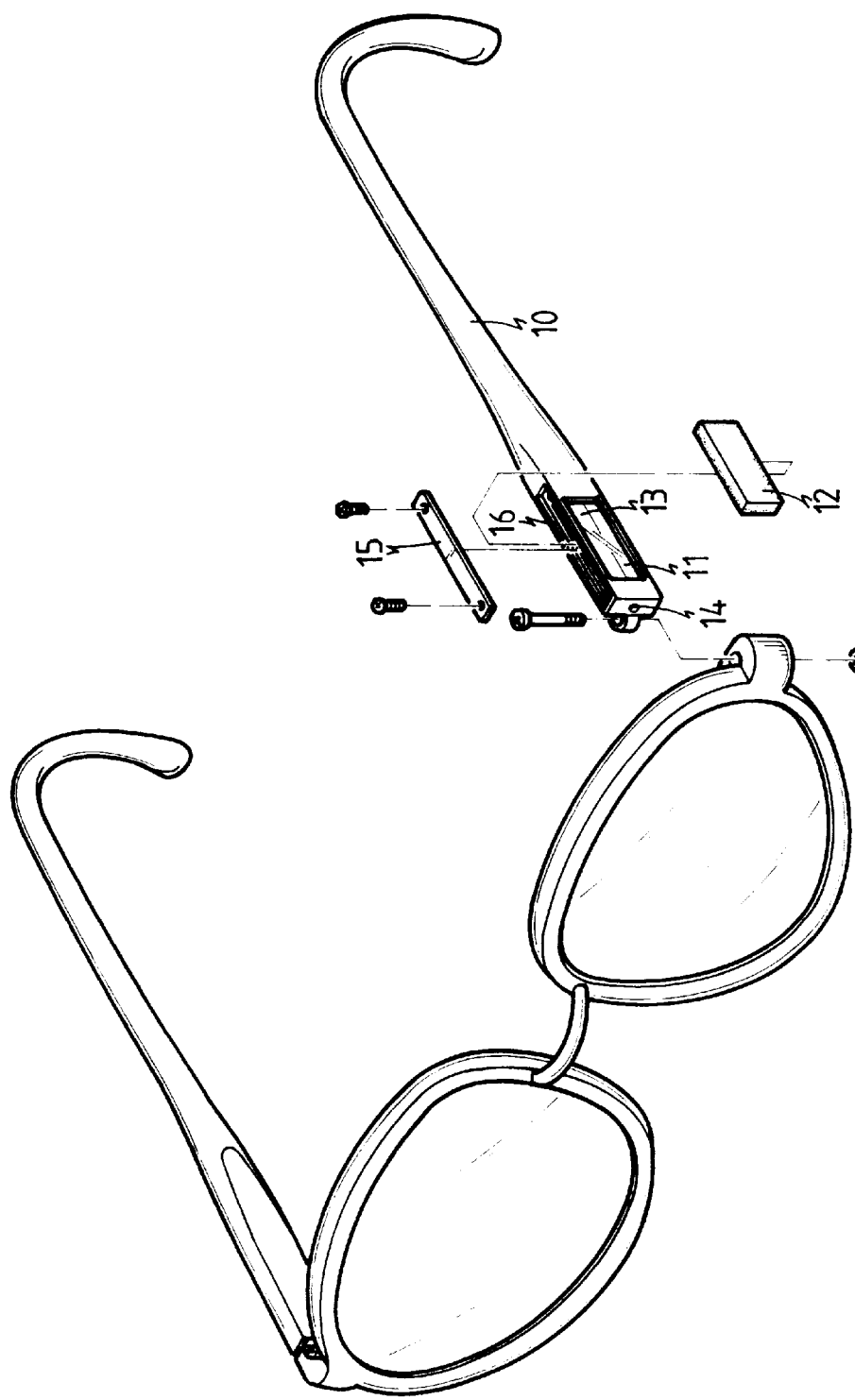

FIG. 6 shows another embodiment of the temple structure of the present invention, wherein the chamber 13 has an opening 16 defined in the top of the temple 10 and a cover 15 is engaged with the opening 16 by bolts so as to close the opening 16. A decorative member 12 is received in the chamber 13 so that the decorative member 12 can be seen via the transparent portion 11. The hole 14 in the end of the temple 10 communicates with the chamber 13 prevents moisture formed on the inside of the transparent portion 11. The decorative member 12 can be a reflector or a name card or a flash means.

It is to be understood that the above description and drawings are only used for illustrating some embodiments of the present invention, not intended to limit the scope thereof. Any variation and derivation from the above description and drawings should be included in the scope of the present invention.

What is claimed is:

1. A temple structure for a pair of eyeglasses, comprising:

a temple having a chamber defined therein and a hole defined in a first end thereof which is adapted to pivotally engage with a front frame, said hole communicating with said chamber, and a tube received in said chamber and having a valve means received therein, said valve means having an operation end which extends through said hole.

2. The temple structure as claimed in claim 1, wherein said chamber having an opening defined in a top of said temple and a cover engaged with said opening.

3. The temple structure as claimed in claim 1 further comprising a transparent portion defined in the outside of said temple so that the interior of said chamber can be seen via said transparent portion.

4. The temple structure as claimed in claim 1, wherein said tube has an annular flange extending radially inward from the inside thereof so as to define a first space and a second space separated by said annular flange, an aperture defined in one of two ends of said tube and communicating with said first space, said valve means received in said first space and having a passage defined therein, an inlet defined radially through the wall of said valve means and communicating with said passage, said operation end extending through said aperture and said hole and having an outlet defined through the distal end thereof, said outlet communicating with said passage, a spring mounted to said valve means and biased between said annular flange and inside of said end having said aperture, said inlet being shifted beyond said annular flange and into said second space by pressing said operation end.

5. The temple structure as claimed in claim 4 further comprising a supply valve attached to said tube and communicating with said second space.

* * * * *